US009093720B2

(12) United States Patent
Park et al.

(10) Patent No.: US 9,093,720 B2
(45) Date of Patent: Jul. 28, 2015

(54) NON-AQUEOUS ELECTROLYTE AND SECONDARY BATTERY COMPRISING THE SAME

(75) Inventors: Pil Kyu Park, Daejeon (KR); Je Young Kim, Daejeon (KR); Sung Hoon Yu, Daejeon (KR); Young Tae Lee, Jeonju (KR); Soon Ho Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 126 days.

(21) Appl. No.: 12/097,226

(22) PCT Filed: Dec. 13, 2006

(86) PCT No.: PCT/KR2006/005438
§ 371 (c)(1),
(2), (4) Date: Jun. 12, 2008

(87) PCT Pub. No.: WO2007/069852
PCT Pub. Date: Jun. 21, 2007

(65) Prior Publication Data
US 2008/0305403 A1 Dec. 11, 2008

(30) Foreign Application Priority Data
Dec. 14, 2005 (KR) ........................ 10-2005-0123179

(51) Int. Cl.
*H01M 10/0569* (2010.01)
*H01M 10/0567* (2010.01)
*H01M 10/42* (2006.01)
*H01M 10/0565* (2010.01)
*H01M 10/0566* (2010.01)

(52) U.S. Cl.
CPC ...... *H01M 10/0569* (2013.01); *H01M 10/0567* (2013.01); *H01M 10/4235* (2013.01); *H01M 10/0565* (2013.01); *H01M 10/0566* (2013.01); *Y02E 60/122* (2013.01)

(58) Field of Classification Search
CPC ............... H01M 10/0569; H01M 10/0567; H01M 10/4235; H01M 10/0566; H01M 10/0565; Y02E 60/122
USPC ................. 429/327, 330, 336, 337, 329, 338; 252/62.2
See application file for complete search history.

(56) References Cited

U.S. PATENT DOCUMENTS

| 3,660,162 | A | * | 5/1972 | Eisenberg | 429/338 |
|---|---|---|---|---|---|
| 4,752,541 | A | * | 6/1988 | Faulkner et al. | 252/62.2 |
| 4,916,676 | A | * | 4/1990 | Miyazawa | 368/80 |
| 5,316,876 | A | * | 5/1994 | Kuriyama et al. | 429/330 |
| 5,506,068 | A | | 4/1996 | Dan et al. | |
| 5,585,208 | A | | 12/1996 | Lian et al. | |
| 6,383,688 | B1 | * | 5/2002 | Inagaki et al. | 429/322 |
| 6,914,768 | B2 | * | 7/2005 | Matsumoto et al. | 361/502 |
| 6,933,080 | B2 | * | 8/2005 | Lee et al. | 252/62.2 |
| 7,226,701 | B2 | * | 6/2007 | Lee et al. | 429/303 |
| 2002/0052293 | A1 | * | 5/2002 | Tsuruya et al. | 502/416 |
| 2003/0190529 | A1 | | 10/2003 | Kim et al. | |
| 2003/0232240 | A1 | * | 12/2003 | Lee et al. | 429/122 |
| 2004/0029018 | A1 | | 2/2004 | Kim et al. | |

FOREIGN PATENT DOCUMENTS

| EP | 1100141 A1 | | 5/2001 |
|---|---|---|---|
| JP | 07-078635 | * | 3/1995 |
| JP | 07-078635 A | | 3/1995 |
| JP | 10-021959 | * | 1/1998 |
| JP | 10-21959 A | | 1/1998 |
| JP | 10-189007 A | | 7/1998 |
| JP | 11-116792 A | | 4/1999 |
| JP | 11-121034 A | | 4/1999 |
| JP | 11-329497 A | | 11/1999 |
| JP | 2000294277 | * | 10/2000 |
| JP | 2001-143747 | * | 5/2001 |
| JP | 2001-210376 | * | 8/2001 |
| JP | 2004-6232 A | | 1/2004 |
| JP | 2004-14472 | * | 1/2004 |
| KR | 10-2003-0025076 A | | 3/2003 |
| KR | 2004-0045083 A | | 6/2004 |
| TW | 266332 | | 12/1995 |
| TW | 375844 | | 12/1999 |

OTHER PUBLICATIONS

TIPO Office Action, Appl. No. 095146736, May 7, 2010, pp. 1-3.
The State Intellectual Property Office of the People's Republic of China, Notification of the Second Office Action, Appl. No. 200680047506.1, Jun. 1, 2010, pp. 1-3 (w/ full English translation).

* cited by examiner

*Primary Examiner* — Laura Weiner
(74) *Attorney, Agent, or Firm* — Birch, Stewart, Kolasch & Birch, LLP

(57) ABSTRACT

Disclosed is a non-aqueous electrolyte comprising: a non-aqueous cyclic solvent; a catalyst for polymerization, which is activated depending on temperature or voltage to induce the polymerization of the non-aqueous cyclic solvent; and an electrolyte salt. Also, a secondary battery comprising the non-aqueous electrolyte is disclosed. The non-aqueous electrolyte does not influence the performance of the battery at the normal operating temperature and voltage of the secondary battery. However, when the battery misoperates due to high temperature or overcharge, the polymerization of the non-aqueous cyclic solvent can occur due to the catalyst for polymerization contained in the non-aqueous electrolyte, at a specific temperature or voltage, to increase the resistance of the electrolyte and reduce the ion conductivity of the electrolyte, thus increasing the safety of the battery.

3 Claims, 2 Drawing Sheets

NON-AQUEOUS ELECTROLYTE AND SECONDARY BATTERY COMPRISING THE SAME

BACKGROUND OF THE INVENTION (a) Field of the Invention

The present invention relates to a non-aqueous electrolyte and a secondary battery comprising the same.

(b) Description of the Related Art

Recently, the compact and lightweight construction of electronic equipment has been realized and the use of portable electronic devices has been generalized, and thus studies on secondary batteries having high energy density have been actively conducted.

Lithium secondary batteries, which are currently mainly used, comprise cathode and anode made of materials capable of intercalating and deintercalating lithium ions, are fabricated by injecting a non-aqueous electrolyte between the cathode and anode, and produce electrical energy by oxidation and reduction reactions, which occur when lithium ions are intercalated into and deintercalated from the cathode and anode.

However, such lithium secondary batteries have a disadvantage in that the non-aqueous electrolyte used therein may cause safety-related problems such as ignition and explosion, and such problems become severe as the capacity density of the batteries is increased. Specifically, when the batteries are overcharged past conventional operating voltage, the cathode will release an excess amount of lithium, which will produce dendrite on the anode. Thus, both the cathode and the anode will be thermally unstable so that a rapid exothermic reaction such as the decomposition of the electrolyte will occur. This exothermic reaction causes thermal runaway, which results in the ignition and explosion of the batteries, thus reducing the safety of the batteries.

Prior techniques proposed to solve the problems resulting from the overcharge of the lithium secondary batteries broadly include methods that use electronic circuits and methods that use chemical reactions.

The methods that use electronic circuits are methods of mechanically interrupting an electric current by promoting the generation of gas when the overcharge of the batteries takes place. These methods have problems in that high cost is incurred and various limitations arise in processes for designing and fabricating the batteries.

The methods that use chemical reactions include a method comprising fusing the separator to shutdown the pores of the separator, and a method in which an appropriate redox shuttle additive, i.e., an oxidation-reduction reagent that undergoes oxidation-reduction cycling, is added to the electrolyte. However, these methods have a problem in that the redox shuttle additive has a short cycle life.

SUMMARY OF THE INVENTION

The present invention has been made in view of the above-described problems occurring in the prior art, and it is an object of the present invention to provide a non-aqueous electrolyte containing a non-aqueous cyclic solvent and a catalyst for polymerization, which can be activated upon exposure of a battery to high temperature or overcharge to induce the polymerization of the non-aqueous cyclic solvent, thus reducing the electrical conductivity of the electrolyte and increasing the safety of the battery, as well as a secondary battery comprising said non-aqueous electrolyte.

To achieve the above object, the present invention provides a non-aqueous electrolyte comprising: a non-aqueous cyclic solvent; a catalyst for polymerization, which is activated depending on temperature or voltage to induce the polymerization of the non-aqueous cyclic solvent; and an electrolyte salt, as well as a secondary battery comprising said non-aqueous electrolyte.

DETAILED DESCRIPTION OF THE INVENTION

Figure 1:
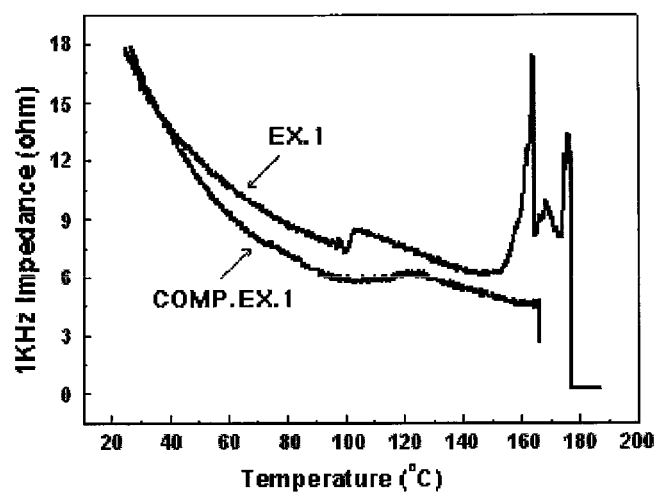
FIG. 1 is a graphic diagram showing the resistance versus the temperature of non-aqueous electrolytes prepared according to Example 1 and Comparative Example 1.

Hereinafter, the present invention will be described in detail.

The present invention is characterized in that a catalyst is selected, which is not activated at room temperature and thus does not serve as a catalyst at room temperature, but is activated at a specific temperature or voltage to induce the polymerization of a non-aqueous solvent. The selected catalyst is then used to constitute a non-aqueous electrolyte together with a non-aqueous cyclic solvent and an electrolyte salt.

The non-aqueous cyclic solvent contained in the non-aqueous electrolyte is hardly polymerized at not only room temperature, but also high temperature, as long as a substance serving to initiate polymerization is not provided thereto.

When the catalyst for polymerization is provided to the non-aqueous cyclic solvent, the catalyst will not be activated at the normal operating temperature and voltage of the battery, so that it will not cause the polymerization of the non-aqueous cyclic solvent at that temperature and voltage. Thus, the catalyst does not influence the performance of the battery. However, when the battery misoperates due to exposure to high temperature or overcharge, the catalyst for polymerization will be activated at a specific temperature or voltage to induce the polymerization of the non-aqueous cyclic solvent. The polymer resulting from the polymerization of the non-aqueous cyclic solvent will increase the resistance of the electrolyte to reduce the ion conductivity of the electrolyte, thus increasing the safety of the battery.

The catalyst for polymerization, which is contained in the inventive non-aqueous electrolyte, is preferably activated at a temperature of 90~200° C. or a voltage higher than 4.4 V to induce the polymerization of the non-aqueous cyclic solvent.

The catalyst for polymerization, which is used in the present invention, can be a base, metal salt or Lewis acid catalyst. Specifically, the catalyst for polymerization can be one or more selected from the group consisting of triethylamine (TEA), DBU (1,8-diazabicyclo[5,4,0]undec-7-ene), $KOCH_3$, $NaOCH_3$, $KOC_2H_5$, $NaOC_2H_5$, NaOH, KOH, Al(acac)$_3$, Cr(acac)$_3$, Co(acac)$_2$, Fe(acac)$_3$, Mn(acac)$_3$, Mn(acac)$_2$, $MoO_2$(acac)$_2$, Zn(acac)$_2$, $AlCl_3$, $TiCl_4$, $ZnCl_2$, Al(O-iPr)$_3$, Ti(OBu)$_4$, Sn(Ph)$_3$Cl, (n-Bu$_3$Sn)$_2$O, $ZnEt_2$, Bu$_2$Sn(OMe)$_2$, BDL, BDPH, 4-DMAP (4-dimethylaminopyridine), Zr(OPr)$_4$, BuLi, $K_2CO_3$, $Na_2CO_3$, $Rb_2CO_3$ and $Cs_2CO_3$.

The catalyst for polymerization can be used in an amount of 0.01~3 wt % based on the total weight of the non-aqueous electrolyte. If the catalyst for polymerization is contained in the non-aqueous electrolyte in an amount of less than 0.01 wt %, it will not cause the polymerization of the non-aqueous cyclic solvent upon exposure of the battery to high temperature or overcharge, or it will result in slow polymerization of the cyclic solvent, thus having an insignificant effect on an improvement in the safety of the battery. On the other hand, if the catalyst for polymerization is contained in an amount of more than 3 wt %, it will not have any further effect resulting from an increase in the content thereof, and will deteriorate the life cycle characteristics of the battery.

The non-aqueous cyclic solvent, which is used in the present invention, may be one or more selected from the group consisting of ethylene carbonate (EC), propylene carbonate (PC), butylene carbonate (BC) and gamma-butyrolactone (GBL).

The electrolyte salt, which is used in the present invention, is not specifically limited as long as it is generally used as an electrolyte salt. The non-limiting examples of the electrolyte salt include salts having a structure such as $A^+B^-$, wherein $A^+$ represents an alkali metal cation such as $Li^+$, $Na^+$, $K^+$, or a combination thereof, and $B^-$ represents an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a combination thereof. A lithium salt is particularly preferred. These electrolyte salts can be used alone or as a mixture of two or more thereof.

The secondary battery according to the present invention can comprise said non-aqueous electrolyte. For example, the inventive secondary battery can comprise: a cathode; an anode; a separator; and said non-aqueous electrolyte. As used herein, the term "secondary battery" is meant to include all lithium metal secondary batteries, lithium ion secondary batteries, lithium polymer secondary batteries and lithium ion polymer secondary batteries.

The secondary battery of the present invention can be fabricated according to a conventional method known in the art by interposing a porous separator between the cathode and the anode and placing said non-aqueous electrolyte into the resulting structure. However, the method of fabricating the secondary battery, which can be used in the present invention, is not limited to any particular method.

The electrodes, which are included in the secondary battery, can be fabricated according to a conventional method known in the art. For example, the electrodes can be fabricated by mixing each of electrode active materials with a binder and a solvent, and optionally a conductive material and a dispersant, stirring the mixture to prepare a slurry, applying the slurry on a metal current collector, and compressing and drying the applied slurry.

The binder and the conductive material can be used in amounts of 1~10 wt % and 1~30 wt %, respectively, based on the weight of the electrode active material.

The cathode active material, which is used in the secondary battery of the present invention, can consist of any one or a mixture of two or more selected from among a variety of lithium-transition metal composite oxides (e.g., lithium manganese composite oxide, lithium nickel oxide, lithium cobalt oxide, and the foregoing oxides wherein part of manganese, nickel and cobalt is replaced with other transition metals and the like such as $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}Co_YO_2$, $LiCo_{1-Y}Mn_YO_2$, $LiNi_{1-Y}Mn_YO_2$ (0≤Y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (0<z<2), $LiCoPO_4$ or $LiFePO_4$, or a lithium-containing vanadium oxide and the like), and chalcogen compounds (such as manganese dioxide, titanium disulfide, molybdenum disulfide and the like). Also, said cathode active material can be formed into the cathode in a form bonded to a cathode current collector, that is, a foil prepared from aluminum, nickel or a combination thereof.

The anode active material, which can be used in the present invention, can consist of a carbon material, a lithium metal or an alloy thereof, which can intercalate and deintercalate lithium ions. In addition, it is possible to use metal oxide such as $TiO_2$ and $SnO_2$, which can intercalate and deintercalate lithium ions and have a potential of less than 2V for lithium. Particularly, a carbon material such as graphite is preferred. Also, said anode active material can be formed into the anode in a form bonded to an anode current collector, that is, a foil prepared from aluminum, nickel or a combination thereof.

Examples of a binder, which can be used in the present invention, include polytetrafluoroethylene (PTFE), polyvinylidene fluoride (PVdF), etc.

As the conductive material, carbon black can generally be used. Currently commercially available conductive materials include acetylene black series (Chevron Chemical Company or Gulf Oil Company), Ketjen Black EC series (Armak Company), Vulcan XC-72 (Cabot Company) and Super P (MMM Company).

The metal current collector is made of a highly conductive metal. For the metal current collector, any metal can be used as long as it can be easily bonded with the electrode active material slurry and is not reactive in the voltage range of the battery. Typical examples of the metal current collector include meshes and foils prepared from a material selected from the group consisting of aluminum, copper, gold, nickel, aluminum alloys, and combinations thereof.

Also, a method of applying the slurry on the current collector is not specifically limited. The slurry can be applied on the current collector using, for example, doctor blading, dipping or brushing, and the amount of slurry applied is also not specifically limited, but is such an amount that the thickness of an active material layer remaining after removal of a solvent or dispersant is generally in the range of about 0.005~5 mm, and preferably about 0.05~2 mm.

Although a separator, which can be used in the present invention, is not limited to any particular separator, a porous separator can be used, examples of which include polypropylene-based, polyethylene-based, and polyolefin-based porous separators.

In addition, although the shape of the secondary battery is not limited to any particular shape, it can have a cylindrical shape, a prismatic shape, a pouch shape or a coin shape.

Hereinafter, the present invention will be described in further detail with reference to examples. It is to be understood, however, that these examples are illustrative only, and the scope of the present invention is not limited thereto.

Example 1

A non-aqueous electrolyte was prepared by dissolving $LiPF_6$ in a non-aqueous solvent having a composition of ethylene carbonate (EC):propylene carbonate (PC)=1:1 (v:v) to a concentration of 1M, and then adding TEA (triethylamine) as a catalyst for polymerization to the solution (EC:PC=1:1 (v:v), 1M $LiPF_6$) in an amount of 2 parts by weight based on 100 parts by weight of the solution.

A cathode was prepared by mixing 94 parts by weight of $LiCoO_2$ as a cathode active material with 3 parts by weight of acetylene black as a conductive material and 3 parts by weight of PVDF as a binder, adding NMP (N-methyl-2-pyrrolidone)

thereto to prepare a cathode slurry, applying the slurry on an aluminum (Al) current collector and drying the applied slurry.

An anode was prepared by mixing 95 parts by weight of artificial graphite as an anode active material with 5 parts by weight of PVDF as a binder, adding NMP thereto to prepare an anode slurry, applying the slurry on a copper (Cu) current collector, and drying the applied slurry.

A lithium ion secondary battery was prepared by interposing a polyolefin-based porous separator between the prepared cathode and anode and then injecting the non-aqueous electrolyte into the resulting structure.

Comparative Example 1

A non-aqueous electrolyte and a battery were prepared in the same manner as in Example 1, except that the catalyst for polymerization was not added in the preparation of the non-aqueous electrolyte.

Experiment 1: Measurement of Ion Conductivity of Electrolyte

The ion conductivity of each of the non-aqueous electrolytes prepared in Example 1 and Comparative Example 1 was measured, and the measurement results are shown in Table 1 below.

TABLE 1

| | Ion conductivity (mS/cm) | |
|---|---|---|
| | Untreated | Treated at 180° C. for 30 minutes |
| Example 1 | 4.50 | 0.88 |
| Comparative Example 1 | 6.41 | 5.98 |

As can be seen in Table 1, the ion conductivity of the non-aqueous electrolyte prepared in Comparative Example 1 was not greatly changed even when the electrolyte was treated at 180° C. for 30 minutes, whereas the ion conductivity of the non-aqueous electrolyte prepared in Example 1 was greatly reduced. This suggests that the non-aqueous electrolyte according to the present invention can have greatly reduced ion conductivity at high temperature and can increase the safety of batteries.

Experiment 2: Measurement of Resistance of Electrolyte at Varying Temperatures

The resistance of each of the non-aqueous electrolytes prepared in Example 1 and Comparative Example 1 was measured at varying temperatures, and the measurement results are shown in FIG. 1.

In the measurement of resistance, a specific amount of each of the non-aqueous electrolytes was interposed between upper and lower cases, which were used in the preparation of a 2016 size coin cell. The cases were crimped with a high-temperature gasket, and then the AC impedance of each of the electrolyte was measured with 4 probes while the temperature thereof in a chamber was increased.

As shown in FIG. 1, the resistance of the non-aqueous electrolyte prepared in Comparative Example 1 was continuously decreased with an increase in temperature. However, the resistance of the non-aqueous electrolyte prepared in Example 1 first decreased with an increase in temperature, then temporarily increased at about 100° C., and rapidly increased at about 150~180° C. This suggests that the catalyst for polymerization in the non-aqueous electrolyte according to the present invention can induce the polymerization of the non-aqueous cyclic solvent at high temperatures to greatly increase the resistance of the electrolyte and to reduce the ion conductivity of the electrolyte, thus increasing the safety of the battery.

Experiment 3: Evaluation of Safety of Batteries by Nail Test at Varying Speeds

Each of the batteries prepared in Examples 1 and Comparative Example 1 was charged to 4.2 V, and then evaluated for safety by carrying out a nail test, in which the batteries were penetrated with a 2.5 mm diameter nail at a speed of 0.3 m/min, 1 m/min or 3 m/min. Also, the conditions of the batteries resulting from the nail test are shown in Table 2 below.

In the nail test, at the moment when the nail penetrates the battery and perforates the separator so that the cathode and the anode are short-circuited, a large amount of electric current flows to instantaneously increase temperature, resulting in ignition in a severe case. As can be seen in Table 2 below, the batteries prepared in Example 1 did not catch fire in the nail test, but the batteries prepared in Comparative Example 1 all caught fire. This suggests that the battery according to the present invention has increased safety.

TABLE 2

| | Number of fire-caught batteries/ number of tested batteries at varying penetration speeds of nail | | |
|---|---|---|---|
| | 0.3 m/min | 1 m/min | 3 m/min |
| Example 1 | 0/3 | 0/3 | 0/3 |
| Comparative Example 1 | 3/3 | 3/3 | 2/3 |

Experiment 4: Evaluation of Safety of Batteries in Hot Box

Figure 2:
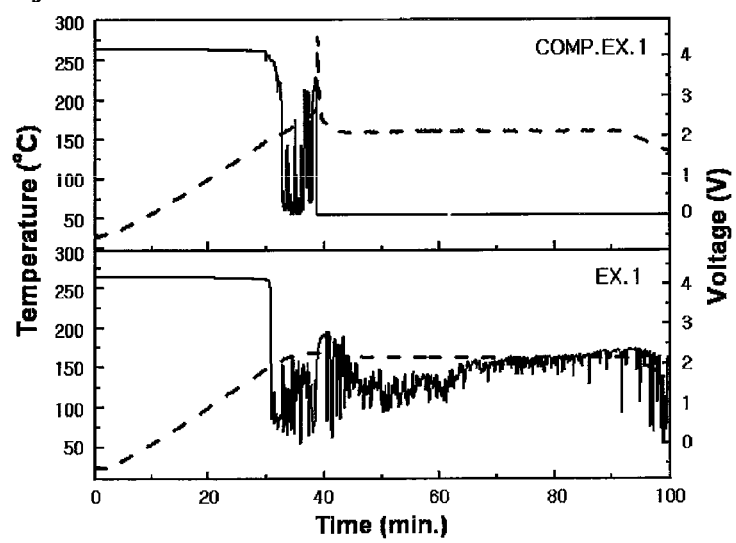
FIG. 2 is a graphic diagram showing changes with time in the temperature and voltage of batteries fabricated according to Example 1 and Comparative Example 1, in which the temperature and voltage were measured in a hot box.

The batteries prepared in Example 1 and Comparative Example 1 were charged to 4.2 V and placed in an oven. The temperature of the oven was elevated to 160° C. at a rate of 5° C./min, and then maintained at 160° C. for 1 hour while changes with time in the temperature and voltage of the batteries were measured, and the measurement results are shown in FIG. 2. In FIG. 2, the solid line indicates voltage, and the dotted line indicates temperature.

As shown in FIG. 2, short circuiting of the battery of Example 1 was not prevented from occurring in the hot box. However, unlike the battery of Comparative Example 1, in the battery of Example 1, the polymerization of the electrolyte occurred to inhibit the reaction between the cathode and the electrolyte, so that the thermal safety of the battery could be increased.

Experiment 5: Evaluation of Safety of Battery Upon Overcharge

Figure 3:
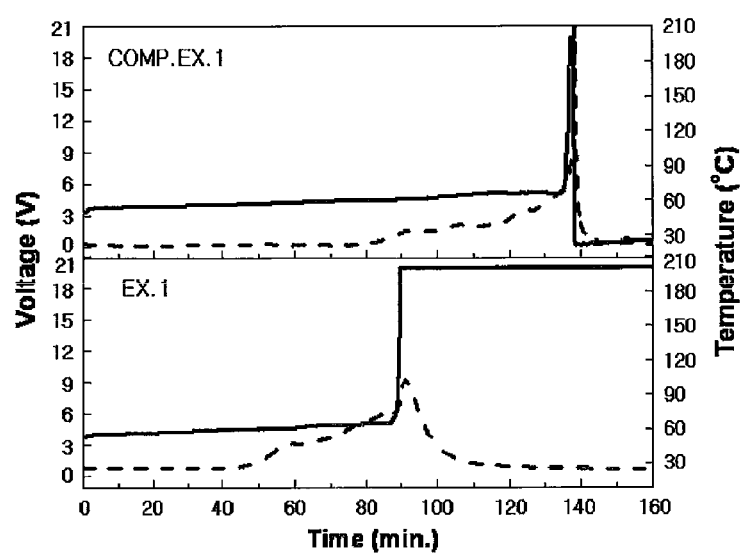
FIG. 3 is a graphic diagram showing changes with time in the temperature and voltage upon overcharge of batteries fabricated according to Example 1 and Comparative Example 1.

The batteries prepared in Example 1 and Comparative Example 1 were evaluated for safety upon overcharge. For this purpose, the batteries were fully charged to 4.2 V at 0.5 C and subjected to an overcharge test. The overcharge test was carried out at 20 V and 1 C, changes with time in the temperature and voltage of the batteries were measured, and the measurement results are shown in FIG. 3. In FIG. 3, the solid line indicates voltage, and the dotted line indicates temperature.

As can be seen in FIG. 3, unlike the battery prepared in Comparative Example 1, the voltage of the battery prepared in Example 1 was increased before the complete release of Li from the cathode, due to an increase in resistance resulting from the polymerization of the electrolyte, and entered a CV (constant voltage) region, so that the safety of the battery could be increased.

INDUSTRIAL APPLICABILITY

As can be seen from the foregoing, the non-aqueous electrolyte according to the present invention does not influence the performance of the battery at the normal operating temperature and voltage of the secondary battery. However, when the battery misoperates due to high temperature or overcharge, the polymerization of the non-aqueous cyclic solvent can occur due to the catalyst for polymerization contained in the non-aqueous electrolyte at a specific temperature or voltage to increase the resistance of the electrolyte and reduce the ion conductivity of the electrolyte, thus increasing the safety of the battery.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A non-aqueous electrolyte comprising:
    a non-aqueous cyclic solvent, wherein the non-aqueous cyclic solvent is one or more selected from the group consisting of ethylene carbonate (EC), propylene carbonate (PC), butylene carbonate (BC) and gamma-butyrolactone (GBL);
    a catalyst for polymerization, which is activated depending on temperature or voltage to induce the polymerization of the non-aqueous cyclic solvent, wherein the catalyst for polymerization is triethylamine (TEA) and is contained in an amount of 0.01-3 wt % based on the total weight of the non-aqueous electrolyte;
    an electrolyte suit.

2. A secondary battery comprising a cathode, an anode and the non-aqueous electrolyte of claim 1.

3. The non-aqueous electrolyte of claim 1, wherein the catalyst for polymerization is activated at a temperature of 90-180° C. or at a voltage higher than 4.4 V.

* * * * *